United States Patent

[11] 3,632,260

[72] Inventor Ernest P. Moslo
    12700 Lake Ave., Lakewood, Ohio 44107
[21] Appl. No. 841,194
[22] Filed July 14, 1969
[45] Patented Jan. 4, 1972

[54] FOAM PLASTIC MOLDING MACHINE
    13 Claims, 9 Drawing Figs.
[52] U.S. Cl............................................ 425/245,
                                               425/247, 425/251
[51] Int. Cl............................................ B29f 1/05
[50] Field of Search................................ 18/5 BE, 5
                                  P, 12 SF, 30 AP, 30 RU, 30 SR

[56] References Cited
    UNITED STATES PATENTS

| | | | |
|---|---|---|---|
| 2,865,050 | 12/1958 | Strauss | 18/30 RV |
| 2,878,515 | 3/1959 | Strauss | 18/30 RV |
| 3,024,498 | 3/1962 | Bronnenkant et al. | 18/30 RV |
| 3,345,690 | 10/1967 | Hagen | 18/5 BE X |
| 3,438,393 | 4/1969 | Godley | 18/30 SR X |
| 3,488,810 | 1/1970 | Gellert | 18/30 RV X |

*Primary Examiner*—Granville Y. Custer, Jr.
*Attorney*—Baldwin, Egan, Walling & Fetzer ABSTRACT: A molding machine for molding foam plastic material such as, for instance, polystyrene beads, comprising a plasticizing extruder mechanism including an extruder barrel for plasticizing and heating the foam plastic material and possessing the ability to maintain the heated plastic material under sufficient pressure to prevent the foaming thereof in the machine, with a nozzle coacting with the barrel, for injecting the heated plastic material into a mold, and with shutoff means coacting with the leading or emitting end of the nozzle for controlling the flow of heated plastic material out the emitting end of the nozzle, and preventing foaming of the plastic material in the nozzle, and in the extruder barrel, but permitting high-pressure ejection of the heated plastic material out through the emitting end of the nozzle into the mold upon movement of the shutoff means to inactive position, after which the shutoff means moves back to active cutoff position. Foaming of the heated plastic material occurs in the mold to form the finished part.

INVENTOR.
ERNEST P. MOSLO
BY
Baldwin, Egan, Walling & Fetzer
ATTORNEYS

INVENTOR
ERNEST P. MOSLO
BY
Baldwin, Egan, Walling & Fetzer
ATTORNEYS

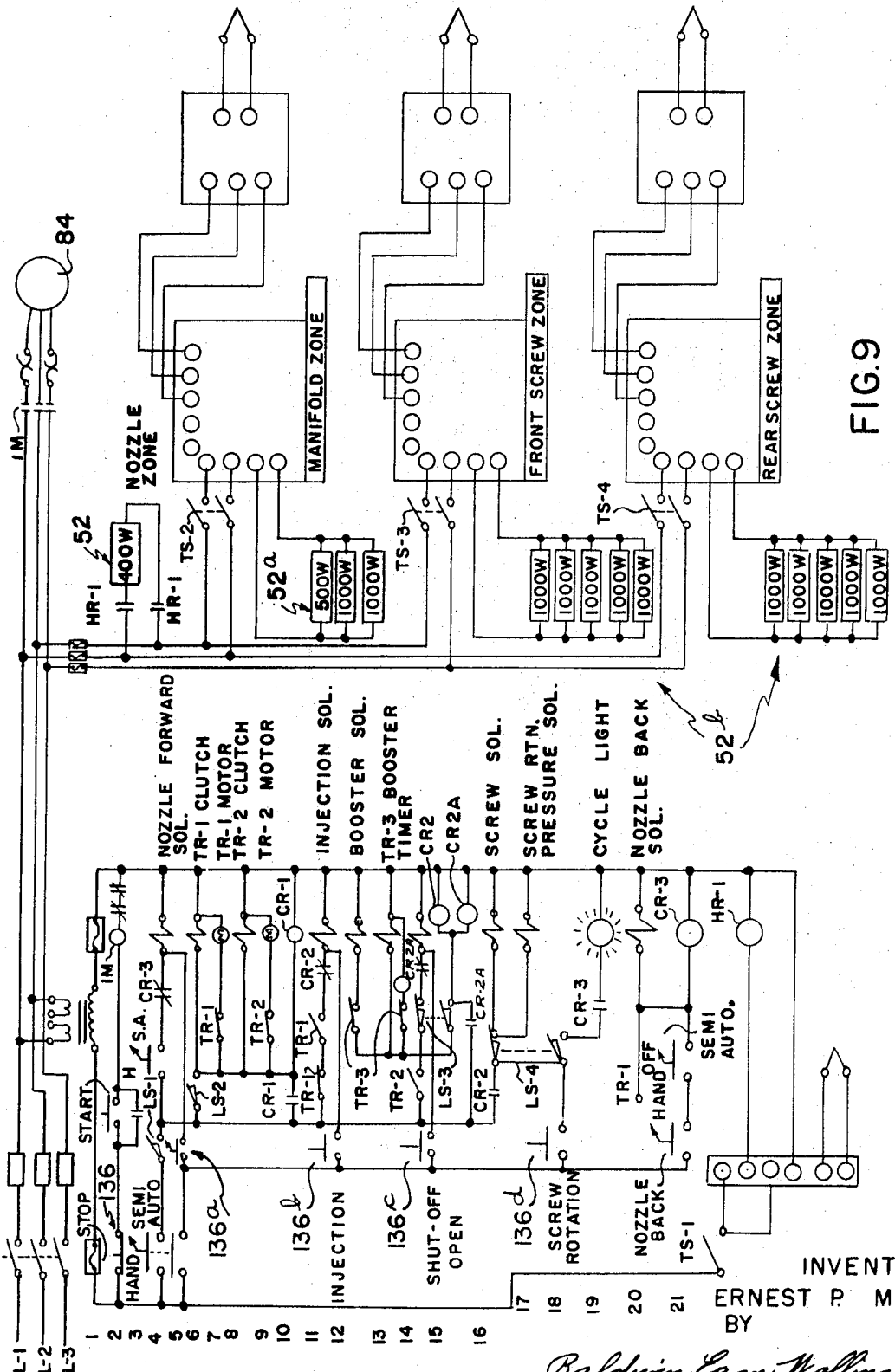

FOAM PLASTIC MOLDING MACHINE

This invention relates to plastic-molding machines, and more particularly to a plastic-molding machine for molding foam plastic material, such as, for instance, polystyrene plastic in granular or bead form.

BACKGROUND OF THE INVENTION

Expandable foam plastic materials are usually processed by molding in closed mold systems using various types of presses to hold the mold in closed condition during the fusion cycle. The sequence steps generally include filling the closed mold with loose, dry, preexpanded beads and then introducing heat to cause expansion of the plastic beads to fill the mold thereby forming the part in the mold. The mold is then permitted to cool and the mold is opened and the part removed.

SUMMARY OF THE INVENTION

The present invention provides a molding machine which is operative to plasticize and heat foam plastic material above its foaming temperature, while maintaining the plastic material under sufficient pressure to prevent the foaming thereof and to control the emission of the hot plasticized material from the molding machine into the mold, so that the foaming or fusion of the material takes place in the mold after pressurized ejection of the heated plastic material from the molding machine.

Accordingly an object of the invention is to provide a novel foam-molding machine.

Another object of the invention is to provide a novel foam-molding machine which includes a plasticizing extruder mechanism having an extruder barrel, with nozzle means coacting with the barrel for transference of the heated plastic material under pressure from the barrel through the nozzle, and including movable shutoff means coacting with the nozzle at the forward or emitting end thereof so as to control the flow of heated plastic material from the nozzle into the mold and prevent any foaming or fusion of the plastic material from occurring in the molding machine.

Another object of the invention is to provide a molding machine of the latter type wherein the nozzle means is spaced laterally of the barrel of the extruder mechanism and is coupled to the barrel by compression manifold means.

A still further object of the invention is to provide a molding machine of the latter type wherein the shutoff means includes an elongated shutoff pin extending through the nozzle and coacting with the forward or emitting end of the passageway through the nozzle so as to prevent fusion or foaming of the plastic material in the nozzle, in the compression manifold means, and in the extruder barrel, and including power means for actuating the shutoff pin from an active position wherein it prevents the ejection of heated plastic material from the leading end of the nozzle to an inactive position wherein the heated plastic material may be ejected under relatively high pressure from the emitting end of the nozzle into a mold, after which the shutoff pin is moved back to active position to prevent foaming of the plastic material in the molding machine.

A still further object of the invention is to provide a molding machine of the latter type wherein the shutoff pin comprises an elongated member having groove means extending lengthwise thereof for passage of the heated plastic material along the shutoff pin, and including a head portion adapted for seating coaction in sealing relation with the forward end of the passageway through the nozzle in the active position of the shutoff means, for cutting off the ejection of heated plastic material from the nozzle into the mold, and for preventing any foaming of the plastic material from occurring in the molding machine.

A still further object of the invention is to provide a molding machine of the latter-described type wherein the extruder barrel includes a rotatable and reciprocal screw, and the machine includes power means for actuating the screw in a manner to maintain sufficient pressure on plastic material in the barrel in conjunction with the shutoff means being in active or closed position, to prevent foaming of the heated plastic material in the molding machine even though the plastic material is above its foaming temperature.

Other objects and advantages of the invention will be apparent from the following description taken in conjunction with the accompanying drawings wherein:

FIG. 9 is a schematic illustration of an electrical control system and electrical heating system which may be used with the molding machine of the invention.

DESCRIPTION OF PREFERRED EMBODIMENT

Figure 1:
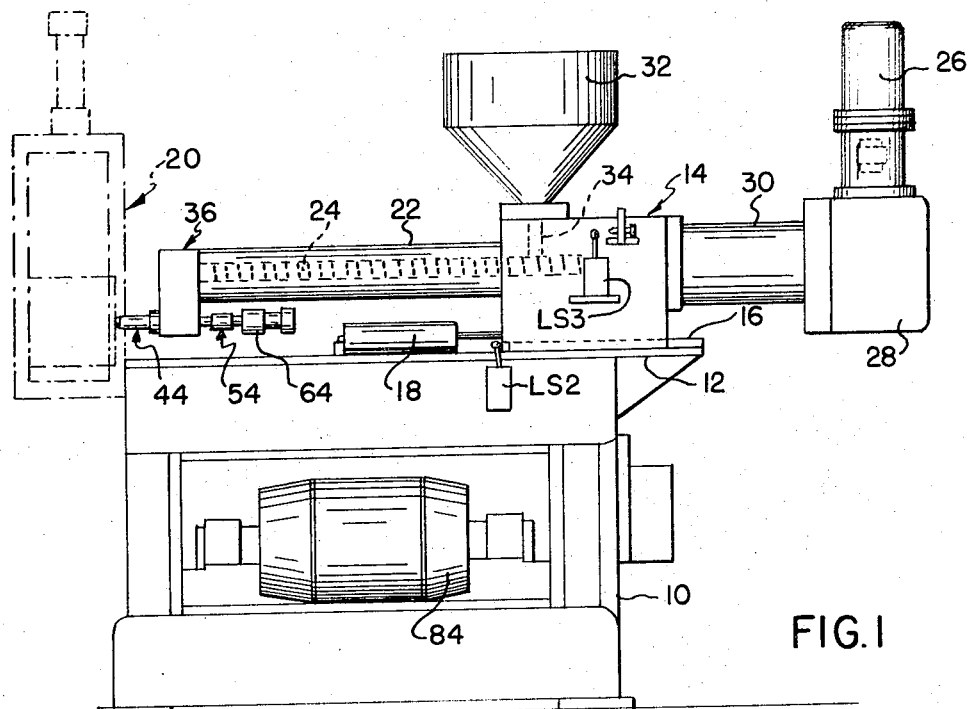
FIG. 1 is a reduced size, generally diagrammatic side elevational view of a foam-molding machine constructed in accordance with the invention. In phantom lines there is illustrated a mold which is adapted for coaction with the nozzle of the foam-molding machine for receiving heated foam plastic material from the molding machine in the molding of a foam plastic part.

Referring to FIG. 1, there is illustrated a foam-molding machine constructed in accordance with the invention. The machine comprises a main frame 10 providing a bed 12 on which is mounted the plasticizing extruder unit 14, for movement lengthwise of the bed 12. Unit 14 may be moved lengthwise of the bed on ways 14 by means of double-acting fluid-powered motor unit 18. Unit 14, in the embodiment illustrated, is adapted for movement into coaction with a sectional mold diagrammatically illustrated at 20. Mold 20 may be of any suitable form and may comprise either a single mold unit or a plurality of mold units mounted on movable support means so that the molds can be sequentially moved into position for coaction with the molding machine.

The plasticizing extruder unit includes an extruder barrel 22 in which is disposed a rotatable and reciprocal extruder screw 24 of known construction. The extruder screw may be rotated with respect to the passageway 25 in the barrel 22 by means of a motor unit, such as rotary preferably variable speed hydraulic motor unit 26, operatively coupled to a geared speed reducer mechanism 28, which in turn is connected to the screw 24 for rotation of the latter. Powered injection cylinder 30 is also provided operatively coupled to the screw 24 for moving the screw lengthwise in passageway 25 and with respect to the extruder barrel 22, for injecting a predetermined quantity of the plasticized heated foam plastic material from the plasticizing extruder unit into the associated mold 20. Injection cylinder 30 is preferably a double-acting reciprocal hydraulic-powered motor unit operatively coupled into a hydraulic system that will be hereinafter described. Reference may be had to U.S. Pat. No. 2,734,226 issued Feb. 14, 1956 to W. H. Willert for a detailed disclosure of a molding machine of the reciprocating screw type.

Hopper 32 is provided for receiving the expandable foam plastic material such as, for instance, polystyrene foam plastic in granular or bead form. The expandable foam plastic material such as expandable polystyrene beads or pellets, may be of the commercially available type and may have the foaming agent or propellant in preferably dry form added separately thereto at the hopper. The plasticizing extruder unit 14 is adapted to plasticize and heat such granular or bead foam plastic material and associated foaming agent to a temperature above the conventional foaming temperature. Entranceway 34 communicates hopper 32 with the screw so that during rotation of the screw, the foam plastic beads or pellets are moved by the screw forwardly (or in other words to the left as viewed in FIG. 1) toward the forward portion of the extruder barrel 22.

Figure 3:
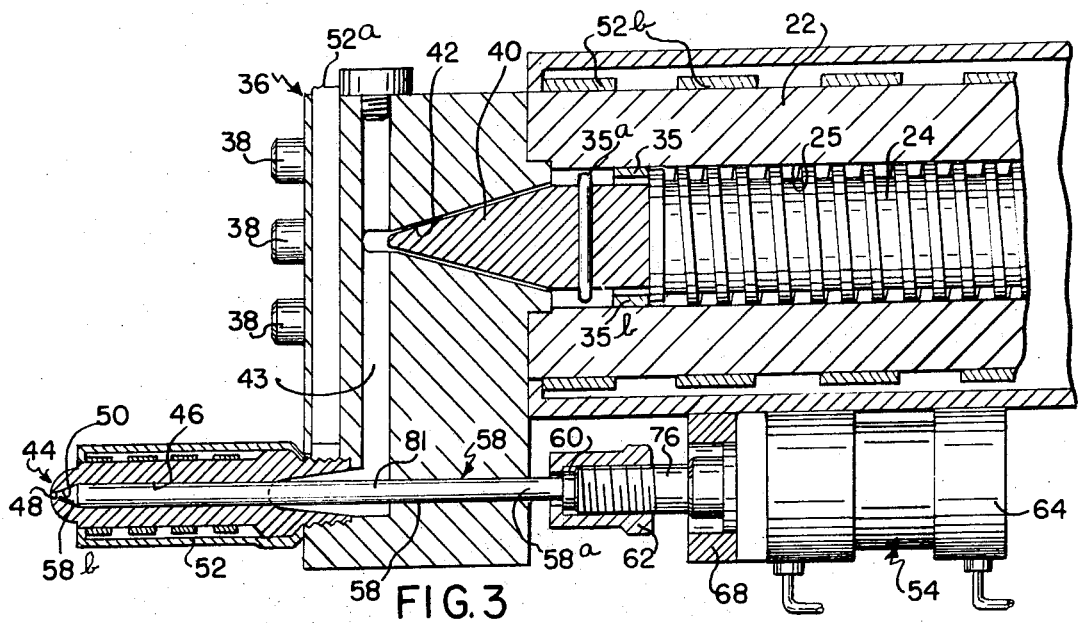
FIG. 3 is an enlarged, sectional, fragmentary elevational illustration of the forward end of the plasticizing extruder, illustrating a compression manifold member and associated nozzle, with shutoff means coacting with the emitting end of the nozzle, and as taken generally along the plane of line 3—3 of FIG. 2, looking in the direction of the arrows.
Figure 4:
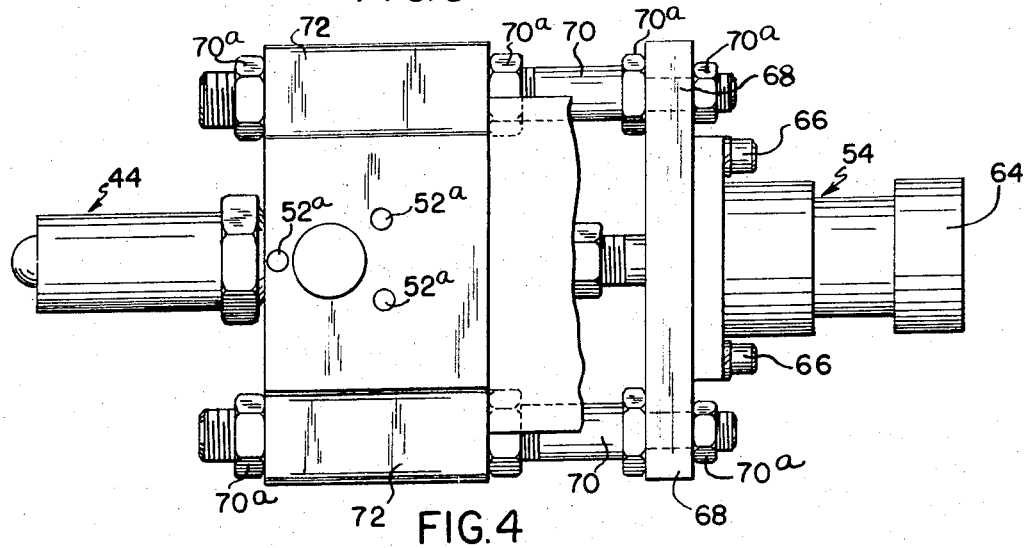
FIG. 4 is a fragmentary top plan view of the FIG. 3 illustration.
Figure 5:
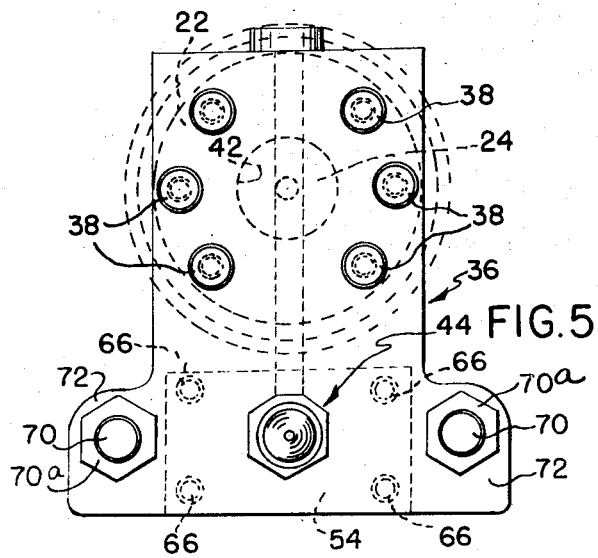
FIG. 5 is a front elevational view of the FIGS. 3 and 4 illustration.

Referring now in particular to FIGS. 3, 4, and 5, the screw 24 may have a flow valve assembly 35 of the ring type mounted on the forward end thereof, so as to control the flow of the heated plastic foam material from the extruder barrel 22 into the compression manifold member 36 which may be attached as by means of bolts 38 to the extruder barrel 22. Pin 35a may limit the forward movement of the ring 35b of assembly 35 with respect to the screw. The screw 24 may have a tapered head portion 40, as illustrated, which is received within a complementary cavity 42 in the compression manifold member 36 when the screw is in its forwardmost reciprocated position with respect to the barrel 22. Vertical passageway 43 extending transversely of compression manifold member 36 communicates with chamber 42, and at its lower end thereof communicates with nozzle 44 of the plasticizing extruder unit.

Nozzle 44 has a lengthwise-extending passageway 46 extending completely therethrough and providing an orifice 48 at its emission end with a tapered internal seat 50 leading into orifice 48. Nozzle 44 preferably has a band heater unit 52 coacting therewith, which may be of the electrical type, for maintaining the nozzle at a predetermined temperature and thus maintaining the foam plastic material in the nozzle in a hot flowable condition. Heating means 52a and 52b may also be associated with respectively manifold 36 and extruder barrel 22, for maintaining the latter at predetermined temperature, and as will hereinafter be further discussed. The plastic material in the nozzle and manifold is preferably maintained at a temperature between approximately 475° to 500 °F. by the aforementioned heater means.

Shutoff means 54 is provided coacting with the nozzle 44 so as to control the emission of plastic from the plasticizing extrusion unit, and operative to prevent foaming of the hot plastic material within the plasticizing extruder unit. The shutoff means comprises a shutoff pin member 58 of elongated construction which includes a shank portion 58a and a tapered head portion 58b. Head portion 58b is formed complementary to the aforementioned tapered seating section 50 of the nozzle and is adapted for engagement therewith in sealing relation, to prevent the flow of plastic material from the plasticizing extruder unit 14 when the shutoff means is in its cutoff or active position. The rearward end of the pin is provided with an enlarged or upset section 60 which is adapted to coact with a coupling member 62, which in turn is secured in preferably removable relation to the piston rod of double-acting preferably fluid-powered motor unit 64.

Motor unit 64 may be a reciprocal double-acting preferably fluid-powered unit which may be secured as by means of bolts 66 to mounting plate 68 which in turn may be mounted as by means of studs 70 and associated nuts 70a to ears 72 of the manifold member 36. It will be seen that upon actuation of motor unit 64 so as to cause retraction of the piston rod 76 thereof, the shutoff pin 58 is moved rearwardly from its seating sealing coaction with seat 50 at the emitting end of the nozzle, to permit ejection of the heated plastic material from the nozzle into the mold. The movement of the shutoff pin from seating engagement may be approximately one-quarter of an inch.

The heated foam plastic material in the extruder barrel, the compression manifold member 36 and the nozzle 44 is under considerable pressure due to the forward longitudinal movement of the screw 24, and when the shutoff means is retracted from its active sealing position, a "shot" of the heated plastic material is made into the mold. Immediately thereafter the shutoff means returns from its inactive retracted position back to active position, to once again seal the emitting end of the nozzle and prevent foaming of the plastic material in the plasticizing extruder mechanism. This "shot" of plastic material may encompass the greater portion of the plastic material ahead of the flow control valve assembly 35 up to seat section 50 in the nozzle.

Figure 6:
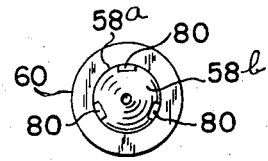
FIG. 6 is an enlarged, side elevational view of the shutoff pin of the shutoff mechanism illustrated in FIGS. 3 and 4.
Figure 7:
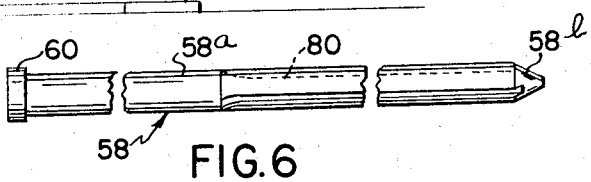
FIG. 7 is a front elevational view of the shutoff pin of FIG. 6.
Figure 2:
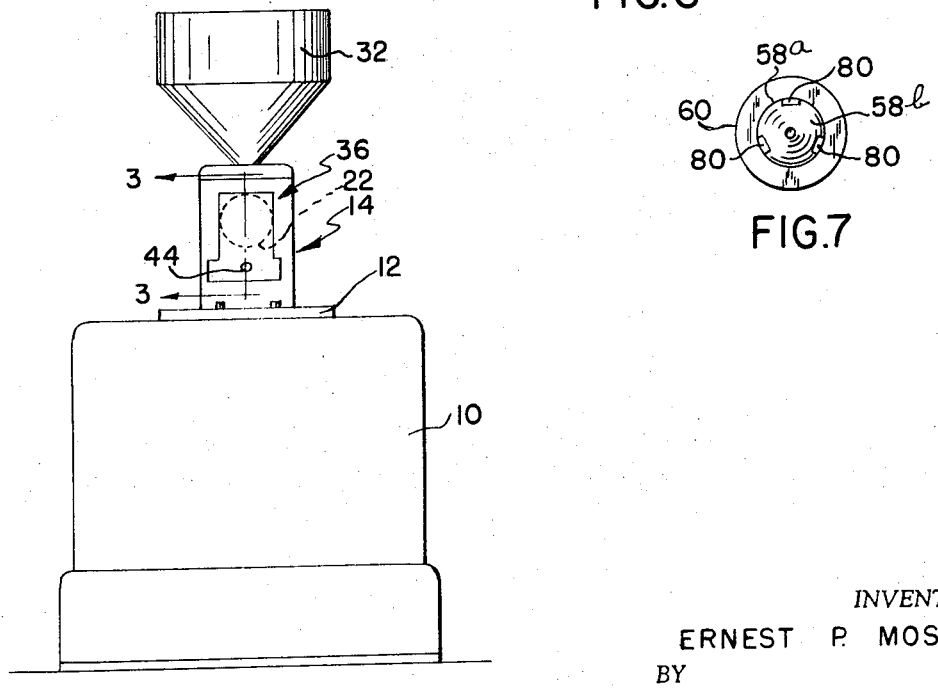
FIG. 2 is a diagrammatic front elevational view of the molding machine of FIG. 1.

Referring now to FIGS. 6 and 7, the aforementioned shank portion 58a of shutoff pin 58 is grooved or slotted lengthwise thereof along a portion of its length commencing forwardly of the upset end 60, as at 80, and extending forwardly to terminate at the periphery of the frustoconcial head portion 58b. In the embodiment illustrated, three grooves are disposed about the periphery of the shank at approximately 120° from one another. These grooves provide for expeditious ejection of a predetermined "shot" of heated plastic material from the nozzle, compression manifold and extruder barrel members into the mold upon movement of the shutoff means 54 from its active cutoff position to an inactive position. In the position of the shutoff pin 58 illustrated in FIG. 3 wherein the pin is in an active cutoff position, the grooves commence at the location of the passageway 43 (as at 81) so that the hot plastic material in the manifold member is immediately accessible to the grooves so that upon movement of the shutoff pin from its active cutoff to an inactive position, the "shot" of hot foam plastic material is immediately ejected under high pressure into the mold.

Figure 8:
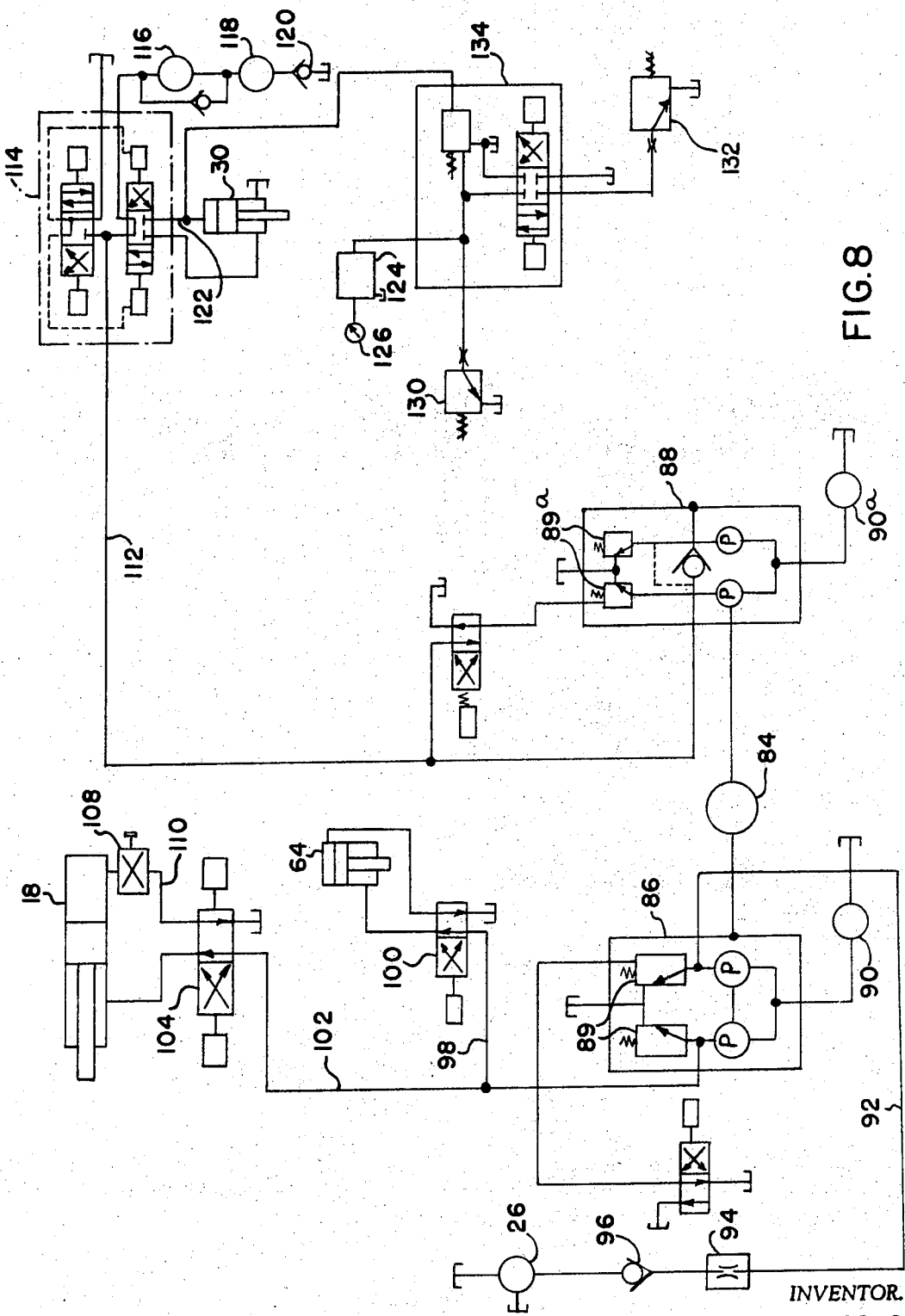
FIG. 8 is a schematic illustration of a hydraulic system for controlling various components of the molding machine.

Referring now to FIG. 8, there is shown a schematic illustration of a hydraulic system which may be utilized in conjunction with the motor units of the molding machine, to actuate the various components thereof. An electric motor 84 (FIGS. 1 and 8) may be provided on the main frame 10 of the molding machine and operatively connected to low-pressure pump section 86 and high-pressure pump section 88 for actuating the latter sections. Low- and high-pressure pump sections 86, 88 may include relief valves 89, 89a for directing the hydraulic fluid back to tank, and may also include conventional oil strainers 90, 90a. The aforementioned fluid-powered rotary motor unit 26 may be coupled as by means of line 92 including flow control valve 94 and check valve 96, to the low-pressure pump section 86 for powering the motor unit 26 in its operation of rotating the screw 24 during plasticizing and heating of the foam plastic material.

The aforementioned shutoff motor unit 64 may be coupled as by means of line 98 and solenoid-operated control valve 100 to the low-pressure pump section for controlling the actuation of motor unit 64 and thus controlling the movement of the shutoff means from active to inactive position and vice versa.

The aforementioned reciprocal motor unit 18 may be coupled by line 102 and solenoid-operated control valve 104 to the low-pressure section of the system, for moving the plasticizing extruder mechanism as a unit on ways 16 toward and away from the mold structure 20. A needle valve 108 may be provided in the control line 110 for selectively varying the rate at which motor unit 18 operates for moving the plasticizer mechanism 14 longitudinally with respect to the base frame 10.

The aforementioned injection power unit 30 may be coupled as by means of line 112 and solenoid-operated control valve mechanism 114 to the high-pressure pump section 88 with the latter control valve mechanism 114 being coupled to a heat exchanger 116, a filter 118, a check valve 120 and then to tank. Application of pressurized fluid via line 122 pressurizes the piston of motor unit 30 and causes forward linear movement of the screw 24 in the barrel 22. Gauge isolator unit 124 is provided in conjunction with pressure gauge 126 which in turn are coupled to the injection pressure relief valve 130, screw rotational pressure relief valve 132 and pressure relief valve mechanism 134.

A typical operating cycle for the molding machine may include first heating up the extruder barrel, the compression manifold and the nozzle in preparation for molding operations. In this connection the barrel may be heated as aforementioned by a plurality of zoned electrical coil heating means 52b, the various heating zones being preferably under separate control of respective adjustable thermostats, as shown for instance in FIG. 9 of the drawings. With the feed screw in its position to the extreme left (with reference to FIG. 1), slow rotation of the screw by the motor unit 26 is started and simultaneously the plastic granules or beads of foam plastic material and preferably solid foaming agent are poured into the hopper 32. The granulated or pelletized foam plastic-foaming agent compound flows from the hopper through the throat opening 34 and is picked up by the screw where the granules are compressed and melted by the action of the screw and associated heating means, as the foam plastic material is advanced to the left. A force of approximately 2,000 p.s.i. may be applied to the plastic material by rotation of the screw in its operation of moving the plastic material toward the forward end of the barrel. The screw may be rotated at a rate of, for instance, approximately 100 r.p.m. By the time the thermoplastic material reaches the forward end of the screw it is thoroughly mixed and plasticized and is deposited ahead of the screw in the forward portion of the barrel and into the compression manifold member and the nozzle. Since the shutoff means is in active position, any ejection or the emission of the plastic material from the emission or leading end of the nozzle is prevented thus causing a thrust load upon the screw in a direction to the right. Such thrust load during rotation of the screw causes the screw to be moved longitudinally toward the right (with reference to FIG. 1).

The force at which the screw will retreat toward the right is controlled by the hydraulic motor unit 30 to which the screw is connected, the aforementioned pressure relief screw rotation pressure relief valve 132 being set so that the screw retreats under a given thrust load.

Referring now to FIG. 9, there is shown schematically a control system which may be utilized for either manually controlling the molding machine for the molding operation, or providing for semiautomatic control. Briefly, the operation for manual control includes setting the selector switch 136 in "-hand" position and then the push buttons 136a, 136b, 136c and 136d may be pressed for the desired operation of the molding machine. For semiautomatic operation, the selector switch 136 is set in "semiauto" position and then the operator may slide the mold 20 into position, thus causing tripping of limit LS1. Tripping or actuation of limit switch LS1 starts the cycle by energizing the nozzle forward solenoid (line 4, FIG. 9) thus causing application of fluid pressure to the motor unit 18 and causing forward movement of the plasticizing extruder mechanism as a unit on ways 16. The unit moves forwardly, thus positioning the forward tip of the nozzle into the conventional complementary recess in the mold, at which time limit switch LS2 is tripped (FIG. 1 and line 6, FIG. 9). Actuation of limit switch LS2 starts the injection timer TR-1, the precompression or shutoff timer TR-2, and the injection forward solenoid (line 11, FIG. 9). Actuation of the injection forward solenoid causes operation of aforementioned valve mechanism 114, causing application of fluid pressure via line 122 to the motor unit 30, thus thrusting the screw in the extruder barrel forwardly toward a position to the extreme left (with reference to FIG. 1), thereby applying a pressure of, for instance, approximately 15,000 p.s.i. on the plastic material disposed forwardly of the screw and in the nozzle. During such time, the feed screw continues to rotate so that upon completion of one injection cycle and actuation of the valve mechanism 114 so as to cut off the fluid pressure via line 122 to valve motor unit 30, the aforedescribed return cycle of the screw will be repeated.

When timer TR-2 times out, the shutoff motor unit 64 is automatically actuated to withdraw the shutoff pin from its active cutoff position to an inactive position, thus making a "shot" of the heated foam plastic material into the mold. While the plastic material is being injected into the mold, the screw continues to move forwardly under the influence of the motor unit 30 until limit switch LS3 (FIG. 1 and line 15, FIG. 9) is tripped. Tripping of limit switch LS3 causes deenergization of valve 100 controlling the shutoff motor unit 64, and deenergizes the control valve mechanism 114 controlling the injection motor unit 30, thus stopping any further forward movement of the plasticizing screw. However, rotation of the screw continues as aforedescribed, thus moving the screw toward the right. This continues until limit switch LS4 (line 17, FIG. 9) is tripped, at which time the injection timer TR-1 times out, thus energizing the motor unit 18 to cause return of the plasticizer extruder mechanism as a unit and withdraw the nozzle from coaction with the mold, thus completing a cycle of operation.

From the foregoing discussion and accompanying drawings it will be seen that the invention provides a novel foam plastic molding machine for molding for instance, polystyrene plastic material, and which includes an extruder barrel for plasticizing and heating the foam plastic material and with a nozzle coacting with the barrel for injecting and heated plastic material into a mold, and with shutoff means coacting with the leading end of the nozzle for controlling the injection of heated plastic material out of the emitting end of the nozzle and preventing foaming of the plastic material in the nozzle and in the extruder barrel, by providing for maintaining the heated plastic material in the barrel and in the nozzle under sufficient pressure so that foaming thereof cannot occur even though the plastic material is at or above the foaming temperature thereof. Foaming of the heated plastic material occurs in the mold which may be held together in clamped relation by relatively low-pressure means.

The terms and expressions which have been used are used as terms of description and not of limitation and there is no intention in the use of such terms and expressions of excluding any equivalents of any of the features shown or described or portions thereof, and it is recognized that various modifications are possible within the scope of the terms and expressions utilized to describe the preferred embodiment of the invention.

What is claimed is:

1. In a molding machine for molding foam plastic material comprising a main frame, plasticizing extruder means including an extruder barrel mounted thereon for longitudinal movement with respect to said main frame, power means for moving said extruder means longitudinally with respect to said main frame, said extruder means including means for injecting heated foam plastic material from said barrel into a mold, said injecting means comprising an injection nozzle and shutoff means coacting with said nozzle for preventing emission of heated foam plastic material therefrom in the active position of said shutoff means and permitting emission of heated foam plastic material therefrom in the inactive position of said shutoff means, compression manifold means coacting between said barrel and said nozzle and providing for transmission of heated plastic material from said barrel to said nozzle, said nozzle and shutoff means being offset laterally with respect to said extruder barrel and coupled to the latter by said compression manifold means, said nozzle having an emitting orifice and a seat adjacent said orifice and leading to the latter, said shutoff means coacting with said seat at the emitting end of said nozzle for preventing emission of plastic material therefrom when said shutoff means is in said active position, said nozzle extending in the same direction as said barrel, other power means for actuating said extruder means, said other power means adapted to provide sufficient pressure on plastic material in said barrel and said nozzle and manifold means to prevent foaming of the plastic material until the latter is ejected from said nozzle, said extruder means being adapted to inject heated foam plastic material into the mold from said nozzle when said nozzle orifice is in coacting relation with the mold due to actuation of the first-mentioned power means, and said shutoff means is moved to said inactive position.

2. A molding machine in accordance with claim 1 wherein said extruder barrel includes a rotatable and reciprocal screw therein, rotation of said screw being adapted to plasticize and heat the foam plastic material and forward movement of said screw via said other power means being adapted to eject heated foam plastic material from said nozzle and under predetermined pressure when said shutoff means is moved to said inactive position.

3. A molding machine in accordance with claim 2 including heater means coacting with said extruder barrel and said nozzle for heating the plastic material in the barrel and nozzle and maintaining such material at a predetermined temperature which represents at least the foaming temperature of the foam plastic material.

4. A molding machine in accordance with claim 3 wherein said heater means is operative to maintain said plastic material at a temperature of between 475° to 500 °F.

5. A molding machine in accordance with claim 3 wherein said forward linear movement of said screw causes application of a pressure of approximately 15,000 p.s.i. on the plastic material in said barrel and said nozzle and wherein said screw exerts a force of approximately 2,000 p.s.i. on the plastic material during rotation of the screw in its operation of moving plastic material toward the forward end of said barrel.

6. A molding machine in accordance with claim 5 wherein said screw is rotated at a rate of approximately 100 r.p.m. to move the foam plastic material forwardly toward the forward end of said barrel.

7. A molding machine in accordance with claim 2 wherein said screw includes a flow valve assembly at the forward end of said screw for controlling the emission of heated plastic material from said barrel into said compression manifold means.

8. A molding machine in accordance with claim 7 wherein said compression manifold means comprises a member secured to said barrel at the forward end thereof and having passageway means extending generally transversely therethrough and communicating said nozzle with said screw whereby heated plastic material can be transmitted from the leading end of said screw laterally to said nozzle during actuation of said screw, said shutoff means including an elongated cutoff pin extending through said nozzle and adapted for sealing coaction with said seat of said nozzle for closing off said nozzle at said forward end in said active position of said shutoff means and for opening said nozzle to permit emission of heated plastic therefrom in the inactive position of said shutoff means.

9. A molding machine in accordance with claim 8 wherein said shutoff means includes power means for reciprocating said cutoff pin in and with respect to said nozzle, and automatic control means including timer means for the last-mentioned power means, said control means being responsive to said longitudinal movement of said extruder means toward a mold to cause actuation of said last-mentioned power means and movement of said pin from said active position wherein said pin is in sealing engagement with said seat to said inactive position wherein said pin is moved away from said seat, and after a predetermined time from said coacting relation of said nozzle orifice with the mold.

10. A molding machine in accordance with claim 8 wherein said cutoff pin comprises an elongated shank portion having groove means in the periphery of said pin and extending generally lengthwise of said shank portion, and a head portion adapted for surface-to-surface seating coaction with said seat in the active position of said cutoff pin, said head portion being of conicallike configuration.

11. A molding machine in accordance with claim 10 wherein said groove means comprises a plurality of grooves disposed circumferentially about said pin and extending generally lengthwise thereof, said grooves being spaced approximately 120° with respect to one another about the periphery of said pin.

12. A molding machine in accordance with claim 9 including means mounting said shutoff means on said manifold means, and means for adjusting the position of said shutoff means with respect to said nozzle.

13. A molding machine in accordance with claim 9 wherein said control means includes means responsive to said movement of said nozzle orifice into said coacting relation with the mold to cause actuation of said other power means to cause said forward linear movement of said screw prior to movement of said pin from said active to said inactive position, thus providing for a shot of plastic material to be injected into the mold.

\* \* \* \* \*